United States Patent [19]
Kirk

[11] 3,777,633
[45] Dec. 11, 1973

[54] STRUCTURE FOR MAKING PHASE FILTERS

[75] Inventor: Joseph Pennell Kirk, Endicott, N.Y.

[73] Assignee: International Business Machines Corporation, Armonk, N.Y.

[22] Filed: Feb. 25, 1972

[21] Appl. No.: 229,496

[52] U.S. Cl. .................................... 95/1 R, 96/38.3
[51] Int. Cl. ......................... G03c 5/00, G03c 11/00
[58] Field of Search ................... 95/1 R; 350/162 R, 350/162 SF; 96/38.3

[56] References Cited

UNITED STATES PATENTS 3,669,673 6/1972 Ih et al. ................................ 96/38.3

*Primary Examiner*—Robert P. Greiner
*Attorney*—Norman R. Bardales et al.

[57] ABSTRACT

A high fidelity phase filter is made from a composite structure composed of a negative photopolymer, preferably a photoresist, layer which is affixed to a photoemulsion substrate in an optically flat and non-opaque coupling relationship. The photopolymer layer has a developed relief image which is derived by exposure of the photopolymer layer through a previously recorded and developed optical density image in the photoemulsion. The density image, and consequently the resultant relief image derived therefrom, is related to the phase modulation desired for the filter. The structure may be used as a master from which filters of the transmissive and/or reflective types are made by conventional mechanical reproduction techniques. Alternatively, it may be used as an integral part of the filter per se by affixing a reflective coating to the surface of the photopolymer layer, in which case the filter is of the reflective type.

8 Claims, 7 Drawing Figures

STRUCTURE FOR MAKING PHASE FILTERS

BACKGROUND OF THE INVENTION

This invention is related to structures for making optical phase filters and particularly of the type which employ a surface modulated medium to alter the phase of an incident wave.

In the past, the developed relief images of a photoemulsion have been employed for making optical phase filters. Because photoemulsions have a non-linear spatial frequency response, complex exposure patterns for generating the relief image are required to compensate for the non-linear response of the photoemulsion.

Photopolymers generally have a uniform spatial frequency response. In the past, the developed relief images of photopolymers have also been employed for making phase filters. However, their use heretofore was not conducive to making high fidelity phase filters. For one thing, complex controls for providing the initial unexposed photopolymer with a uniform thickness are required. Variations in the thickness of the photopolymer, which is also true for the case of photoemulsions, adversely affect the phase quality of the resultant filter.

SUMMARY OF THE INVENTION

It is an object of this invention to provide a structure for making high fidelity phase filters.

Another object of this invention is to provide a structure for making high fidelity phase filters in which the effects of variations in the thickness of the medium which is used to record the relief image are mitigated.

Still another object of this invention is to provide a structure for making a high fidelity phase filter which structure becomes an integral part of the filter.

Still another object of this invention is to provide a structure for making high fidelity phase filters which structure acts as a master for mechanically reproducing the filters therefrom.

According to one aspect of this invention, there is provided structural apparatus for making a high fidelity phase filter with a predetermined phase modulation characteristic. The apparatus comprises photoemulsion substrate means which has a developed optical density image recorded therein that is related to the phase modulation characteristic. In addition, negative type photopolymer layer means are affixed to the photoemulsion substrate means in an optically flat and nonopaque coupling relationship. The photopolymer layer means has a developed relief image derived by exposure of the photopolymer layer through the density image of the photoemulsion substrate means.

Still another aspect of the invention is to provide a phase filter in which the aforedescribed structural apparatus is an integral part of the filter.

The foregoing and other objects, features and advantages of the invention will be apparent from the following more particular description of the preferred embodiments of the invention, as illustrated in the accompanying drawing.

BRIEF DESCRIPTION OF THE DRAWING

In the FIGURES, like elements are designated with similar reference numerals.

DESCRIPTION OF THE PREFERRED EMBODIMENTS

Figure 1A:
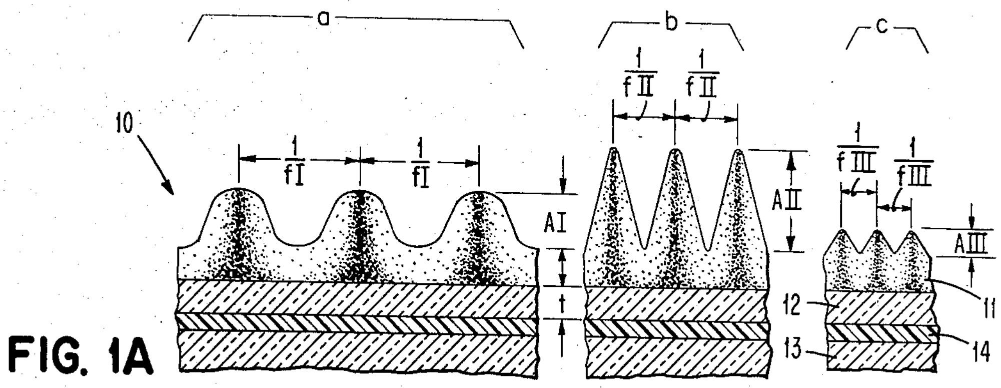
FIGS. 1A-1D are enlarged partial cross-sectional views of an embodiment of the structural apparatus of the present invention at different stages of its formation.
Figure 1B:
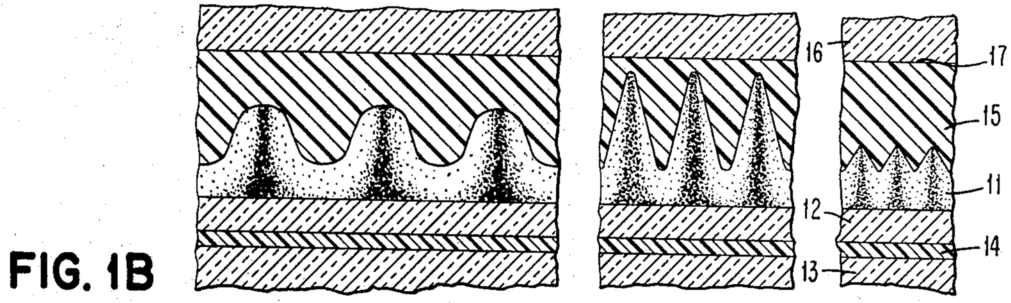

The construction of the structural apparatus of the present invention will be first be described with reference to FIGS. 1A–1D.

First there is provided a photoemulsion substrate means 10 which includes photoemulsion layer 11. Layer 11 contains a developed optical density image which is related to the phase modulation characteristic desired for the filter which is to be made from the inventive structural apparatus being described. The recording of the optical image in layer 11 and its subsequent development is done by conventional photographic techniques well-known to those skilled in the art. For sake of clarity and explanation, in FIGS. 1A–1D stippling is utilized to represent the dark portions of the density image in layer 11. Furthermore, for purposes of explanation, it is assumed that the density image has a sinusoidal density distribution with spatial frequencies *f*I, *f*II, *f*III in layer 11 in the regions designated with the reference characters *a*, *b*, *c*, respectively, where *f*I<*f*II<*f*III.

In practice, the photoemulsion substrate means 10 is preferably a photographic plate consisting of the aforementioned photoemulsion layer 11 which is affixed to a transparent support member 12, such as glass for example. A commercially available photographic plate 11, 12 which can be utilized in the present invention, for example, is the Kodak High Resolution Plate, Kodak is a registered tradename of Eastman Kodak Company.

In cases where it is desirable to provide the structural apparatus of the invention with greater rigidity, a transparent base plate 13 having a substantially greater thickness dimension than the corresponding thickness dimension t of member 12 is affixed to the bottom of member 12 by a suitable transparent adhesive such as an epoxy cement 14. For example, a commercially available cement for this purpose is Epoxi-Patch 0151 Clear manufactured by the Hysol Division of the Dexter Corporation.

Figure 2:
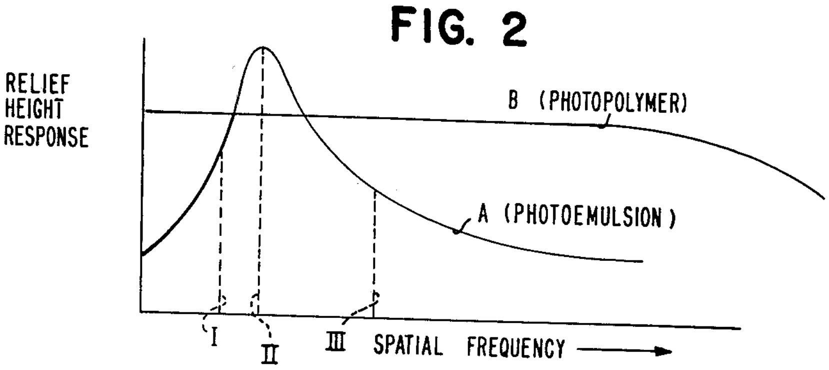
FIG. 2 is an idealized waveform diagram of the spatial frequency response of two typical photosensitive materials.

By way of explanation, it is assumed that the spatial frequencies *f*I, *f*II, and *f*III correspond to the spatial frequencies I, II, III, respectively, shown in the waveform diagram of FIG. 2. Assuming that the photoemulsion of the layer 11 has the spatial frequency response of waveform A shown in FIG. 2, then the amplitudes of the surface undulations of the layer 11 in their respective regions *a*, *b*, *c* are AI, AII, AIII, respectively. Under the assumed conditions, and because of the non-linear spatial frequency response of the photoemulsion layer 11, the aforementioned amplitudes are non-uniform and have the following relationship: AII>AI>AIII. As is obvious to one skilled in the art, if it is desired to provide a uniform response, some means for compensating for the non-uniform response of the emulsion would be required. For example, in the case where the density image is formed in the substrate 11 by exposing the substrate 11 with a light scanner then some complex control means would be required to control the intensity of the light beam so as to provide the aforementioned compensation. Alternatively, or in combination therewith, complex bleaching and/or dyeing techniques during the development of the density image would be required. However, in the present invention these complex requirements are obviated.

Next the hereinafter described photopolymer layer means is affixed to the layer 11 in an optically flat and non-opaque coupling relationship. Preferably a suitable transparent epoxy cement 15 is used for this purpose. A commercially available cement 15 which can be used is, for example, the aforementioned Epoxi-Patch. In practice, a sufficient quantity of the cement 15, e.g. a drop, is applied in its uncured state to the center of the undulated surface of layer 11. An optical flat member 16 has its optical flat surface 17, which is coated with a suitable release agent, brought into contact with the undulated surface of layer 11. In this position, the member 16 and assembly 11–13 are wrung together until the cement 15 has spread over the entire surface of the density image. After the cement 15 has cured, member 16 is removed leaving the outer surface of layer 15 optically flat.

Figure 1C:
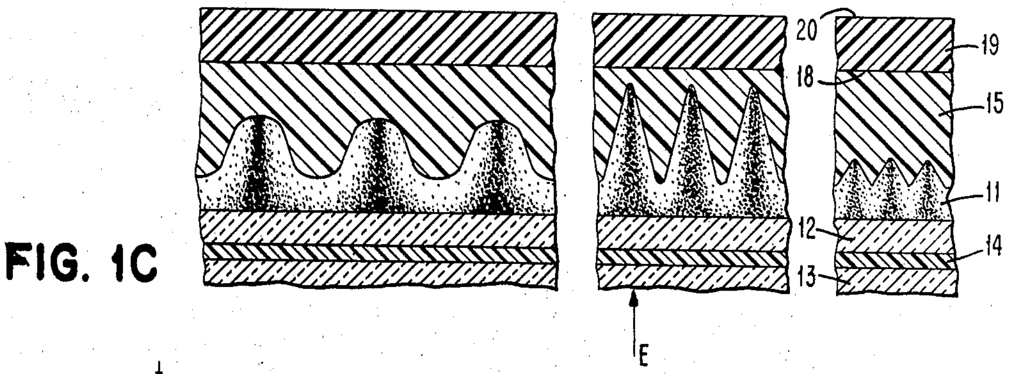

Next, as shown in FIG. 1C the last-mentioned optical flat surface, which is designated therein by the reference numeral 18, is coated with a negative type photopolymer 19 which has a uniform spatial frequency response. In the preferred embodiment, the photopolymer is of the negative photoresist type. A photoresist suitable for this purpose, for example, is KOR, Kodak Ortho Resist, Kodak is a registered tradename of Eastman Kodak Company. Thereafter, the photopolymer layer 19 is exposed through the density image of the photoemulsion layer 11. For this purpose a flood type exposure is utilized and which backside exposure passes through the sequence of elements 13, 14, 12, 11, 15, 18, 19 shown in FIG. 1C and in a direction indicated by the arrow E shown therein.

Next, the photopolymer layer 19 is developed. In the case of the preferred photoresist, conventional fixing/etching techniques are utilized to develop the photoresist. As a result, there is provided in the photopolymer layer 19 a relief image which has a uniform amplitude B1 but which is a high fidelity spatial frequency replica of the density image in the photoemulsion layer 11. As can be appreciated by those skilled in the art the invention does not require complex thickness control for applying the undeveloped negative type photopolymer 19 to the support assembly 11–15. More particularly, in accordance with the principles of the present invention because the photopolymer is of the negative type and is backside exposed, it is subsequently developed inwardly from its outer surface 20. This results in the high fidelity relief image, but with a uniform amplitude characteristic, of the optical density image in photoemulsion layer 11.

Figure 1D:
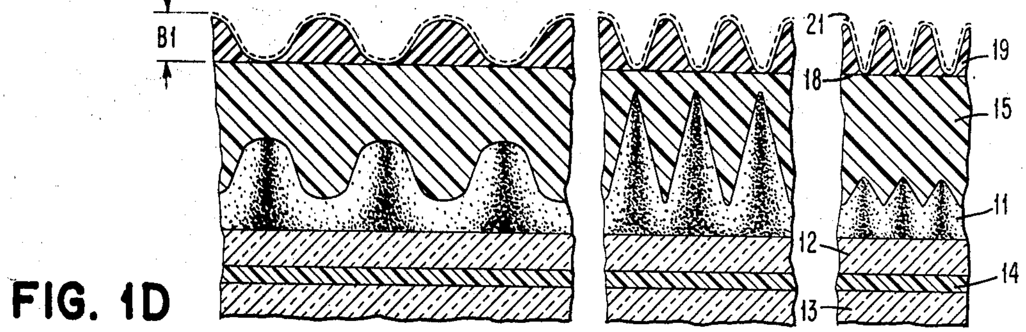

The composite structure shown in FIG. 1D can then be used to make the high fidelity phase filters. For example, the structure shown in FIG. 1D may be used as a master for making the filters. For example, employing conventional mechanical recording techniques the undulated surface of the photoemulsion layer 19 may be recorded on one surface of a flat member, not shown, which is to be used as the filter. If the member, not shown, is transparent then it would be a filter of the transmissive type. Alternatively, the member, not shown, may have its undulated surface coated with a reflective material, or the member itself may be of a reflective material in which cases it would be a filter of the reflective type.

Alternatively, the structure per se shown in FIG. 1D may be configured as a reflective type filter. For example, a reflective coating of a suitable material, e.g. aluminum, such as the reflective coating 21 shown in dash line form in FIG. 1D may be provided.

Figure 3:
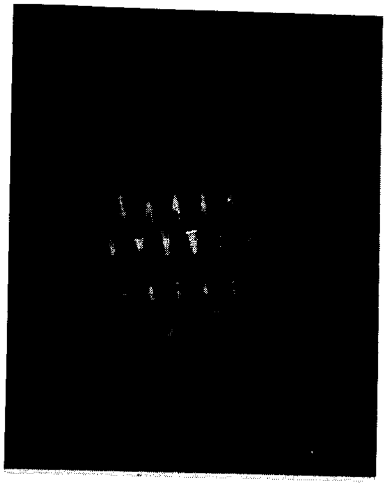
FIGS. 3 and 4 are photomicrographs of the developed relief images of a certain photopolymer and a certain photoemulsion, respectively, which are exposed through identical density images.
Figure 4:
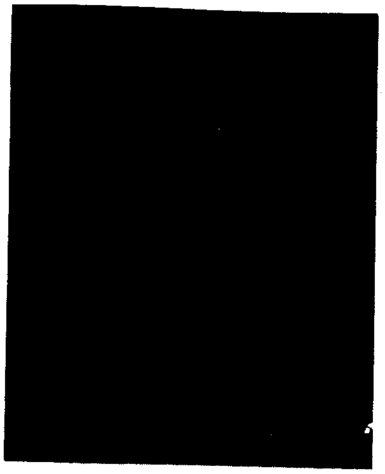

By way of comparison, there is shown in the photomicrographs of FIGS. 3 and 4 the developed relief images of a photopolymer and of a photoemulsion, respectively, as viewed from their respective frontal surfaces through an interferometer. Identical sawtooth exposure patterns were used to produce the relief images of FIGS. 3 and 4. The relief image of FIG. 3 was made using the principles of the invention. The relief image of FIG. 4 was made using conventional photographic techniques. In addition, a conventional tanning technique was employed to enhance the relief image formation of FIG. 4. The photopolymer used was the aforementioned KOR. The photoemulsion used was the aforementioned Kodak High Resolution Plate. As can be readily seen, the relief image of the photopolymer is rather sharp and clear in comparison to that of the photopolymer.

It should be understood that while the invention has been particularly shown and described with reference to preferred embodiments, it will be understood by those skilled in the art that the foregoing and other changes in form and detail may be made therein without departing from the spirit and scope of the invention.

I claim:

1. Apparatus for making a high fidelity phase filter with a predetermined phase modulation characteristic, said apparatus comprising:

photoemulsion substrate means having a developed optical density image recorded therein related to said phase modulated characteristic, negative type photopolymer layer means affixed to said photoemulsion substrate means in an optically flat and non-opaque coupling relationship, said photopolymer layer means having a developed relief image derived by exposure of said photopolymer layer through said density image of said photoemulsion substrate means, said relief image being utilized to provide said phase modulation characteristic for said filter, and means for affixing said photopolymer layer means to said photoemulsion substrate means in said relationship.

2. Apparatus according to claim 1 wherein said photopolymer layer means is of the photoresist type.

3. Apparatus according to claim 1 wherein said filter is of the reflective type said structural apparatus further comprising reflective coating means coating said relief image and coacting therewith to provide said filter.

4. Apparatus according to claim 1 wherein said structural apparatus is a master member for making said filter therefrom.

5. The method of making a high fidelity phase filter with a predetermined phase modulation characteristic, said method comprising the steps of:

providing photoemulsion substrate means having a developed optical density image recorded therein related to said phase modulation characteristic,
providing affixing means for affixing negative type unexposed photopolymer layer means to said photoemulsion substrate means in an optically flat and non-opaque coupling relationship,
affixing said layer means to said substrate means in said relationship by said affixing means,
exposing said photopolymer layer means through said optical density image of said photoemulsion substrate means, and
developing said photopolymer layer means to develop a relief image therein proportional to the optical density image, said relief image being utilized to provide said phase modulation characteristic for said filter.

6. The method according to claim 5 wherein said photopolymer layer means is of the photoresist type.

7. The method according to claim 5 further comprising the step of:
providing a reflective coating means to said relief image to coact therewith to provide said filter.

8. The method according to claim 5 further comprising the step of:
reproducing the relief image of said structural apparatus in the filter made therefrom.

* * * * *